United States Patent
Huang et al.

(10) Patent No.: US 12,483,111 B2
(45) Date of Patent: Nov. 25, 2025

(54) VOLTAGE CONTROL METHOD AND ELECTRONIC SYSTEM

(71) Applicant: MEDIATEK INC., Hsinchu (TW)

(72) Inventors: Chung-Hsin Huang, Hsinchu (TW); Guo-Huei Chang, Hsinchu (TW); Tse-Chung Li, Hsinchu (TW); Chang-Feng Lee, Hsinchu (TW); Chen-An Yu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 228 days.

(21) Appl. No.: 18/388,282

(22) Filed: Nov. 9, 2023

(65) Prior Publication Data

US 2025/0158504 A1    May 15, 2025

(51) Int. Cl.
*H02M 3/158* (2006.01)
*G06F 1/26* (2006.01)
*H02M 1/00* (2006.01)

(52) U.S. Cl.
CPC ............ *H02M 1/0045* (2021.05); *G06F 1/26* (2013.01); *H02M 1/0006* (2021.05); *H02M 1/0032* (2021.05); *H02M 3/158* (2013.01)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074;

(Continued)

(56) References Cited

U.S. PATENT DOCUMENTS

| | | | | |
|---|---|---|---|---|
| 6,031,362 A * | 2/2000 | Bradley | ............ | H02M 3/33561 323/267 |
| 11,061,423 B2 * | 7/2021 | Lee | .......... | G05F 1/575 |
| 2010/0219687 A1 * | 9/2010 | Oh | ............ | G05F 1/46 307/39 |

* cited by examiner

*Primary Examiner* — Jeffrey A Gblende
(74) *Attorney, Agent, or Firm* — McClure, Qualey & Rodack, LLP

(57) ABSTRACT

A voltage control method for a switched mode power supply (SMPS) is provided. A first voltage value is determined, and a voltage adjustment mode of the SMPS is enabled. In the voltage adjustment mode, user modules operate in an operation scenario, and whether one of the user modules enables a high-voltage requirement is determined according to operation states of at least two user modules. In response to one user module enabling the high-voltage requirement, the switched mode power supply is controlled to generate a power supply voltage with the first voltage value. LDOs generate output voltages according to the power supply voltage for driving the user modules respectively. In response to none of the plurality of user modules enabling the high-voltage requirement, the SMPS is controlled to generate the power supply voltage with a voltage value that is less than the first voltage value.

20 Claims, 5 Drawing Sheets

(58) Field of Classification Search
CPC ............ H02M 1/0077; H02M 1/0045; H02M 1/0006; H02J 3/46; H02J 3/38
See application file for complete search history.

VOLTAGE CONTROL METHOD AND ELECTRONIC SYSTEM

BACKGROUND OF THE INVENTION

Field of the Invention

The invention relates to a voltage control method, and more particularly to a voltage control method with power loss saving in power transmission from a switched mode power supply to back-end low dropout voltage regulators (LDOs).

Description of the Related Art

Generally, in a power management integrated circuit (PMIC), particularly in a PMIC for mobile devices, a DC-to-DC converter is used to generate an output voltage as a power supply source for back-end low dropout voltage regulators (LDOs) thereby saving power. However, the operation scenarios of a mobile system are complex, the specification requirements of the chip power are strict, and the voltages of the LDOs are limited. Thus, the control on the output voltage of the DC-to-DC converter cannot effectively optimized, and power loss in power transmission from DC-to-DC converter to the back-end LDOs is increased disadvantageously.

BRIEF SUMMARY OF THE INVENTION

An exemplary embodiment provides a voltage control method for a switched mode power supply is provided. The switched mode power supply generates a power supply voltage to a plurality of low dropout voltage regulators, and the plurality of low dropout voltage regulators drives a plurality of user modules respectively in an electronic system according to the power supply voltage. The voltage control method comprises steps of determining a plurality of voltage values at least comprising a first voltage value and enabling a voltage adjustment mode of the switched mode power supply. In the voltage adjustment mode, the voltage control method further comprises steps of controlling the plurality of user modules to operate in a first operation scenario of the electronic system; determining whether one of the plurality of user modules enables a high-voltage requirement according to operation states of at least two of the plurality of user modules in the first operation scenario to generate a first determination signal; in response to the first determination signal indicating that one of the plurality of user modules enables the high-voltage requirement, controlling the switched mode power supply to generate the power supply voltage with the first voltage value, wherein the plurality of low dropout voltage regulators output a plurality of output voltages according to the power supply voltage for driving the plurality of user modules respectively; and in response to the first determination signal indicating that none of the plurality of user modules enables the high-voltage requirement, controlling the switched mode power supply to generate the power supply voltage with a voltage value of the plurality of voltage values that is less than the first voltage value.

Another exemplary embodiment provides an electronic system. The electronic system comprises a power management circuit, a plurality of low dropout voltage regulators, a plurality of user modules, and a processor. The power management circuit comprises a switched mode power supply generating a power supply voltage. The power management circuit determines a plurality of voltage values at least comprising a first voltage value and enables a voltage adjustment mode of the switched mode power supply. The plurality of low dropout voltage regulators output a plurality of output voltages according to the power supply voltage for driving the plurality of user modules respectively. The plurality of user modules are driven by the plurality of output voltages respectively. The processor controls the plurality of user modules to operate in a first operation scenario of the electronic system in response to the voltage adjustment mode. In the voltage adjustment mode, the power management circuit operates to determine whether one of the plurality of user modules enables a high-voltage requirement according to operation states of at least two of the plurality of user modules in the first operation scenario to generate a first determination signal. In response to the first determination signal indicating that one of the plurality of user modules enables the high-voltage requirement, the power management circuit controls the switched mode power supply to generate the power supply voltage with the first voltage value, wherein the plurality of low dropout voltage regulators output a plurality of output voltages according to the power supply voltage for driving the plurality of user modules respectively. In response to the first determination signal indicating that none of the plurality of user modules enables the high-voltage requirement, the power management circuit controls the switched mode power supply to generate the power supply voltage with a voltage value of the plurality of voltage values that is less than the first voltage value.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
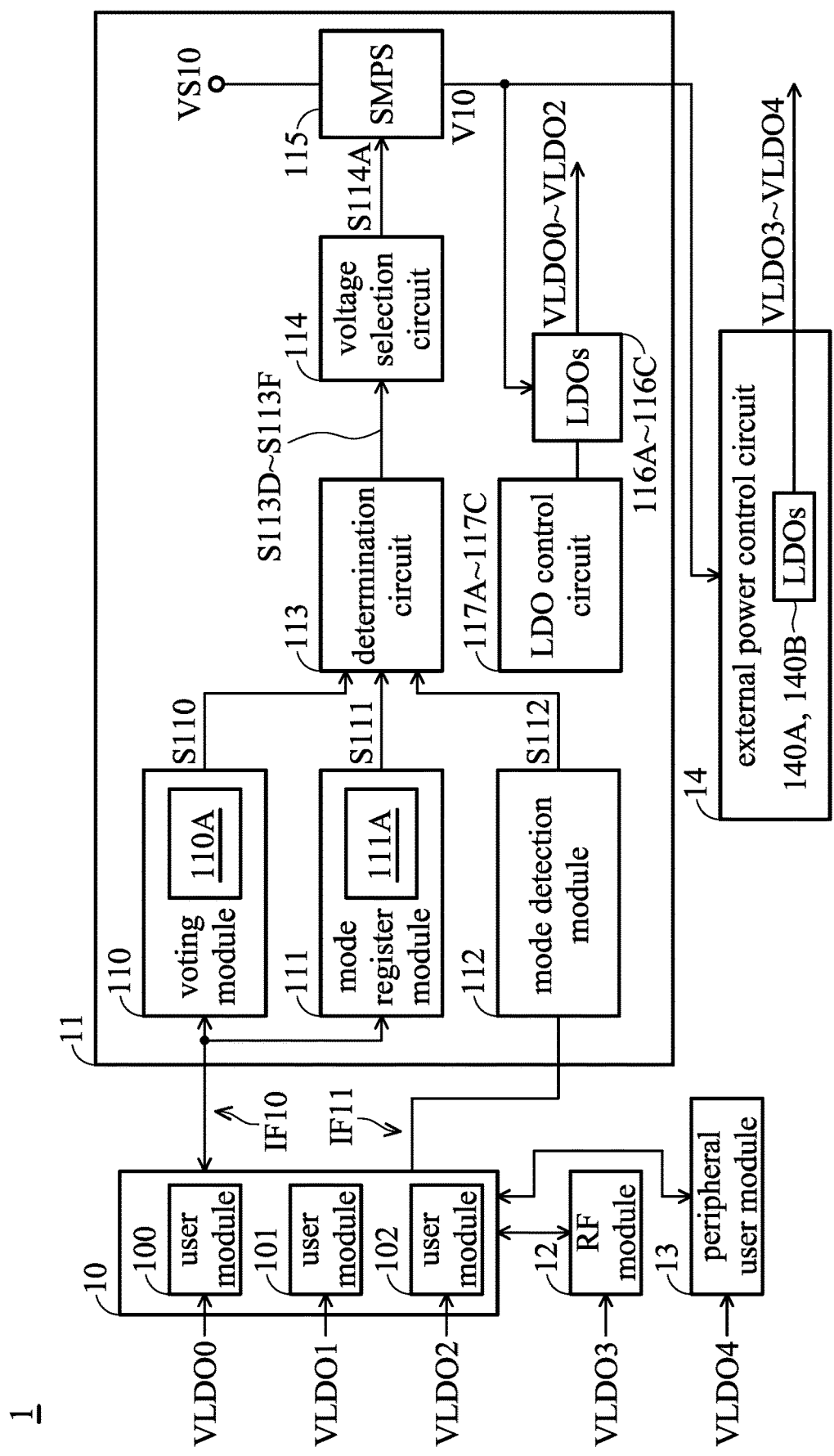
FIG. 1 shows an exemplary embodiment of an electronic system.

FIG. 1 shows an exemplary embodiment of an electronic system. As shown in FIG. 1, an electronic system 1 comprises a processor 10 and a power management circuit 11. In the embodiment, the power management circuit 11 is implemented by a power management integrated circuit (PMIC). A communication interface IF10 and a hardware interface IF11 are built between the processor 10 and the power management circuit 11.

As shown in FIG. 1, the processor 10 comprises a plurality of user modules that are supplied by voltages output from LDOs. In the embodiment, three user modules 100-102 are given as an example. Each of the user modules 100-102 is implemented by one of a universal flash storage, a display panel, a backlight module, an audio player, an analog-to-digital converter, and any units or device supplied by a voltage from an LDO. The electronic system 1 further comprises a plurality of peripheral user modules disposed outside the processor 10. For example, the peripheral user modules comprise a radio frequency (RF) module 12 and another peripheral user module 13. The operation states of the user modules 100-102 and 12-13 vary with the operation scenarios of the electronic system 1. The operation state of each user module indicates an operation speed, an operation voltage, and/or loading of the corresponding user module. In the embodiment, the operation state of each user module is determined according to a normal mode or a low power mode of the corresponding user module.

The power management circuit 11 comprises a voting module 110, a mode register module 111, a mode detection module 112, a determination circuit 113, a voltage selection circuit 114, a switched mode power supply (SMPS) 115, a plurality of low dropout voltage regulators (LDOs) 116A-116C, and a plurality of LDO control circuits 117A-117C. One of the LDO control circuits operates to control one of the LDOs. In the embodiment, three LDOs 116A-116C and three LDO control circuits 117A-117C are given as an example. The LDO control circuits 117A-117C control the LDOs 116A-116C respectively. The power management circuit 11 previously determines several adjustment stages for a power supply voltage V10, which is generated by the switched mode power supply 115, in a voltage adjustment mode of the switched mode power supply 115. For example, the switched mode power supply 115 is a buck, boost and buck-boost related converter.

The voting module 110 comprises a register 110A. The processor 10 detects the operation states of at least two of the user modules 100-102 and 12-13 to generate at least two voting bits respectively. In the embodiment, one valid voting bit represents that the corresponding user module enables a high-voltage requirement according to its operation state. The processor 10 writes the at least two voting bits into the register 110A through the communication interface IF10. The voting module 110 reads the at least two voting bits from the register 110A and determines whether one of the at least two voting bits is valid to generate a determination signal S110. When one of the at least two voting bits is valid, the voting module 110 asserts the determination signal S110 to have a high voltage level.

Referring to FIG. 1, the mode register module 111 comprises a register 111A. In the embodiment, the operation state of each user module is determined according to a normal mode or a low power mode of the user module. For each user module, the supplied voltage for the normal mode is greater than the supplied voltage for the low power mode. The processor 10 detects the operation states of all of the user modules 100-102 and 12-13 to generate a plurality of mode bits respectively. For each user module, when the operation state is determined according to the normal mode, the user module enables a high-voltage requirement, and the corresponding mode bit is valid; when the operation state is determined according to the low power mode, the corresponding mode bit is invalid. The processor 10 writes the mode bits into the register 111A through the communication interface IF10. In the embodiment, one valid voting bit represents that the corresponding user module enables the high-voltage requirement. The mode register module 111 reads the mode bits from the register 111A and determines whether one of the mode bits is valid to generate a determination signal S111. When one of the mode bits is valid, the mode register module 111 asserts the determination signal S111 to have a high voltage level.

As shown in FIG. 1, the processor 10 comprises a plurality of pins that are coupled to the mode detection module 112 through the hardware interface IF11. In the embodiment, the operation state of each user module is determined according to a normal mode or a low power mode of the user module. For each user module, the supplied voltage for the normal mode is greater than the supplied voltage for the low power mode. The processor 10 detects the operation states of all of the user modules 100-102 and 12-13 and determines the voltage levels of the pins of the processor 10 according to the detected operation states respectively. For each user module, when the operation state is determined according to the normal mode, the user module enables a high-voltage requirement, and the processor 10 sets the corresponding pin to a high voltage level; when the operation state is determined according to the low power mode, the processor 10 sets the corresponding pin to a low voltage level. The mode detection module 112 detects the voltage levels of the pins of the processor 10 and determines whether one of the voltage levels of the pins is high to generate a determination signal S112. When the determination signal S112 indicates that one of the voltage levels of the pins is high, the mode detection module 112 asserts the determination signal S112 to have a high voltage level.

In one embodiment, not all of the one voting module 110, the mode register module 111, and the mode detection module 112 perform the respective determination operations. For example, one of the voting module 110, the mode register module 111, and the mode detection module 112 is enabled to perform the corresponding determination operation, the others thereof do not perform the respective determination operations and de-assert the corresponding determination signals to have a low voltage level.

Figure 2:
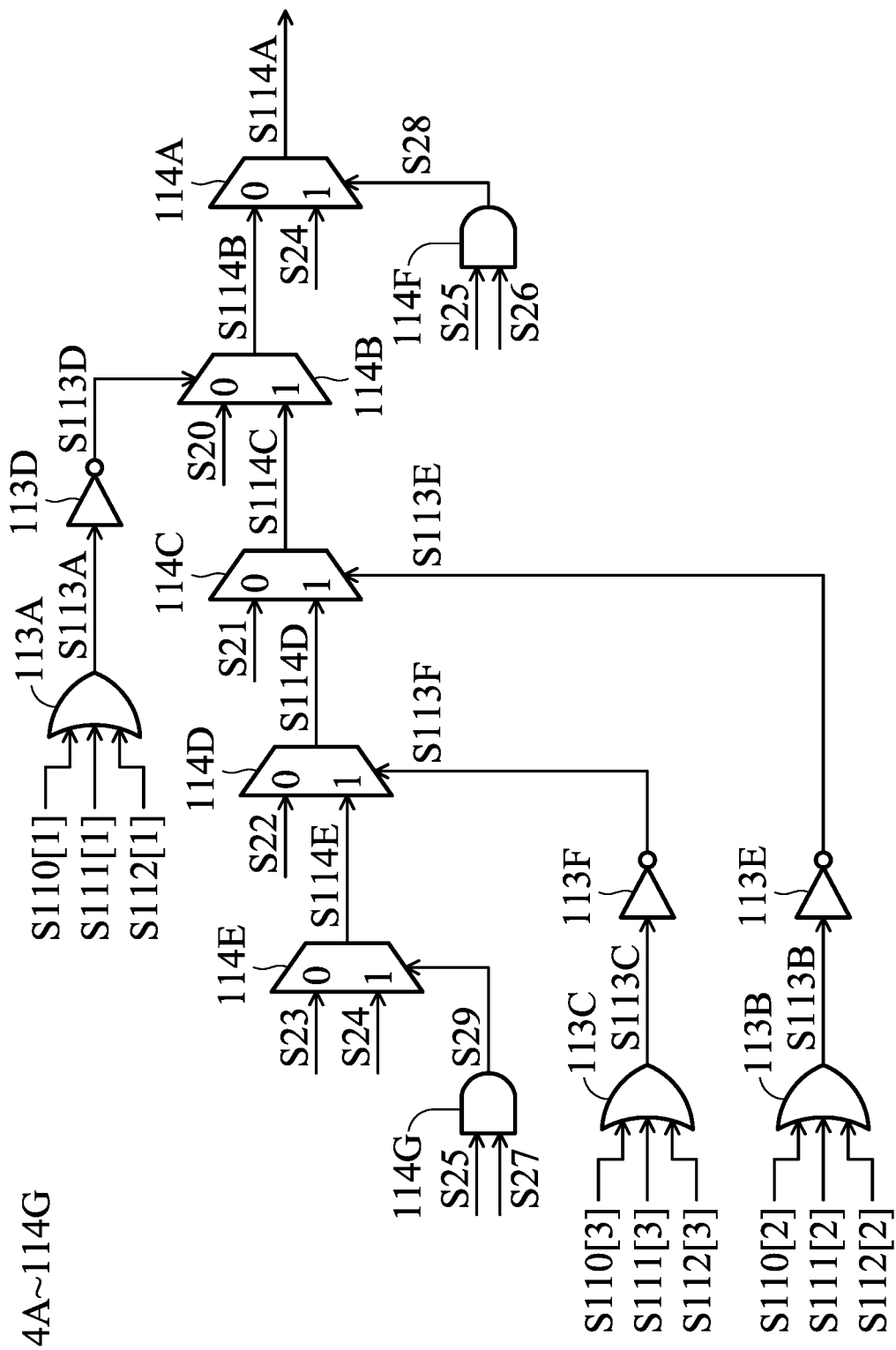
FIG. 2 is a schematic diagram showing an exemplary embodiment of a determination circuit and a voltage selection circuit in the electronic system of FIG. 1.

FIG. 2 is a schematic diagram showing an exemplary embodiment of the determination circuit 113 and the voltage selection circuit 114. The power management circuit 11 determinates a plurality of voltage values to generate a plurality of voltage setting signals respectively for the adjustment stages of the power supply voltage V10 in the voltage adjustment mode. In the embodiment of FIG. 2, there are four adjustment stages, and the power management circuit 11 determinates four voltage values to generate four voltage setting signals S20-S23 for the four adjustment stages. According to the embodiment, the voltage values respectively corresponding to the voltage setting signals S20-S23 are gradually decreased, in other words, the voltage value corresponding to the voltage setting signal S23 is less than the voltage values corresponding to the voltage setting signals S20-S22. Based on the four adjustment stages as shown in FIG. 2, the determination circuit 113 comprises OR gates 113A-113C and inverters 113D-113F, and the voltage selection circuit 114 comprises multiplexers 114A-114E and AND gates 114F-114G. The inverters 113D-113F are coupled to the output terminals of the OR gates 113A-113D respectively. Each of the OR gates 113A-113D receives the determination signals S110-S112 and generates an output signal at its output terminal, and each of the inverters 113D-113F receives an output signal generated by the corresponding OR gate.

As shown in FIG. 2, the OR gate 113A receives the determination signals S110-S112 that are generated respectively by the voting module 110, the mode register module 111, the mode detection module 112 in a first operation scenario of the electronic system 1. In order to clearly explain the operation of the determination circuit 113, the determination signals that generated in the first operation scenario are represented by S110(1)-S112(1). The OR gate 113A generates an output signal S113A according to the determination signals S110(1)-S112(1). The inverter 113D receives the output signal S113A and inverts the output signal S113A to generate a determination signal S113D to the multiplexer 114B. The multiplexer 114B receives the voltage setting signal S20 by the negative input terminal ("0") and further receives a selected voltage setting signal S114C, which is output from the multiplexer 114B, by the positive input terminal ("1") as a specific voltage setting signal. The multiplexer 114B outputs a selected voltage setting signal S114B. The multiplexer 114B is controlled by the determination signal S113D to selectively output one of the voltage setting signal S20 and the selected voltage setting signal S114C as the selected voltage setting signal S114B.

The OR gate 113B receives the determination signals S110-S112 that are generated respectively by the voting module 110, the mode register module 111, the mode detection module 112 in a second operation scenario of the electronic system 1. In order to clearly explain the operation of the determination circuit 113, the determination signals that generated in the second operation scenario are represented by S110(2)-S112(2). The OR gate 113B generates an output signal S113B according to the determination signals S110(2)-S112(2). The inverter 113E receives the output signal S113B and inverts the output signal S113B to generate a determination signal S113E to the multiplexer 114C. The multiplexer 114C receives the voltage setting signal S21 by the negative input terminal ("0") and further receives a selected voltage setting signal S114D, which is output from the multiplexer 114C, by the positive input terminal ("1"). The multiplexer 114C outputs the selected voltage setting signal S114C. The multiplexer 114C is controlled by the determination signal S113E to selectively output one of the voltage setting signal S21 and the selected voltage setting signal S114D as the selected voltage setting signal S114C (that is, the specific voltage setting signal for the multiplexer 114B).

The OR gate 113C receives the determination signals S110-S112 that are generated respectively by the voting module 110, the mode register module 111, the mode detection module 112 in a third operation scenario of the electronic system 1. In order to clearly explain the operation of the determination circuit 113, the determination signals that generated in the third operation scenario are represented by S110(3)-S112(3). The OR gate 113C generates an output signal S113C according to the determination signals S110 (3)-S112(3). The inverter 113F receives the output signal S113C and inverts the output signal S113C to generate a determination signal S113F to the multiplexer 114D. The multiplexer 114D receives the voltage setting signal S22 by the negative input terminal ("0") and further receives a selected voltage setting signal S114E, which is output from the multiplexer 114E, by the positive input terminal ("1"). The multiplexer 114D outputs the selected voltage setting signal S114D. The multiplexer 114D is controlled by the determination signal S113F to selectively output one of the voltage setting signal S22 and the selected voltage setting signal S114E as the selected voltage setting signal S114D.

In the embodiment, the power management circuit 11 sets a priority to a sleep mode or the above voltage adjustment mode of the switched mode power supply 115. For the sleep mode, the power management circuit 11 determinates a sleep voltage value to generate a sleep-voltage setting signal S24.

Referring to FIG. 2, the AND gate 114F receives a sleep-mode control signal S25 and a sleep-mode priority signal S26 and generates a selection signal S28 according to the sleep-mode control signal S25 and the sleep-mode priority signal S26. When the power management circuit 11 sets the priority to the sleep mode of the switched mode power supply 115, the sleep-mode priority signal S26 is asserted to have a high voltage level. The multiplexer 114A receives the selected voltage setting signal S114B by the negative input terminal ("0") and further receives the sleep-voltage setting signal S24 by the positive input terminal ("1"). The multiplexer 114A outputs a selected voltage setting signal S114A that serves as the final voltage setting signal. The multiplexer 114A is controlled by the selection signal S28 to selectively output one of the selected voltage setting signal S114B and the sleep-voltage setting signal S24 as the final voltage setting signal S114A.

The AND gate 114G receives the sleep-mode control signal S25 and an adjustment-mode priority signal S27 and generates a selection signal S29 according to the sleep-mode control signal S25 and the adjustment-mode priority signal S27. When the power management circuit 11 sets the priority to the voltage adjustment mode of the switched mode power supply 115, the adjustment-mode priority signal S27 is asserted to have a high voltage level. The multiplexer 114E receives the voltage setting signal S23 for a fourth operation scenario by the negative input terminal ("0") and further receives the sleep-voltage setting signal S24 by the positive input terminal ("1"). The multiplexer 114E outputs the selected voltage setting signal S114E. The multiplexer 114E is controlled by the selection signal S29 to selectively output one of the voltage setting signal S23 and the sleep-voltage setting signal S24 as the selected voltage setting signal S114E.

Referring to FIG. 1, the power management circuit 11 outputs the final voltage setting signal S114A to control the switched mode power supply 115. The switched mode power supply 115 receives a supply voltage from a voltage source VS10, such as a battery, and generates the power supply voltage V10. The switched mode power supply 115 further receives the final voltage setting signal S114A from the voltage selection circuit 114. The switched mode power supply 115 is controlled by the final voltage setting signal S114A to adjust or change the power supply voltage V10.

Referring to FIG. 1, the electronic system 1 further comprises an external power control circuit 14. The external power control circuit 14 comprises at least one LDO. In the embodiment of FIG. 1, two LDOs 140A-140B in the external power control circuit 14 are given as an example.

Figure 3:
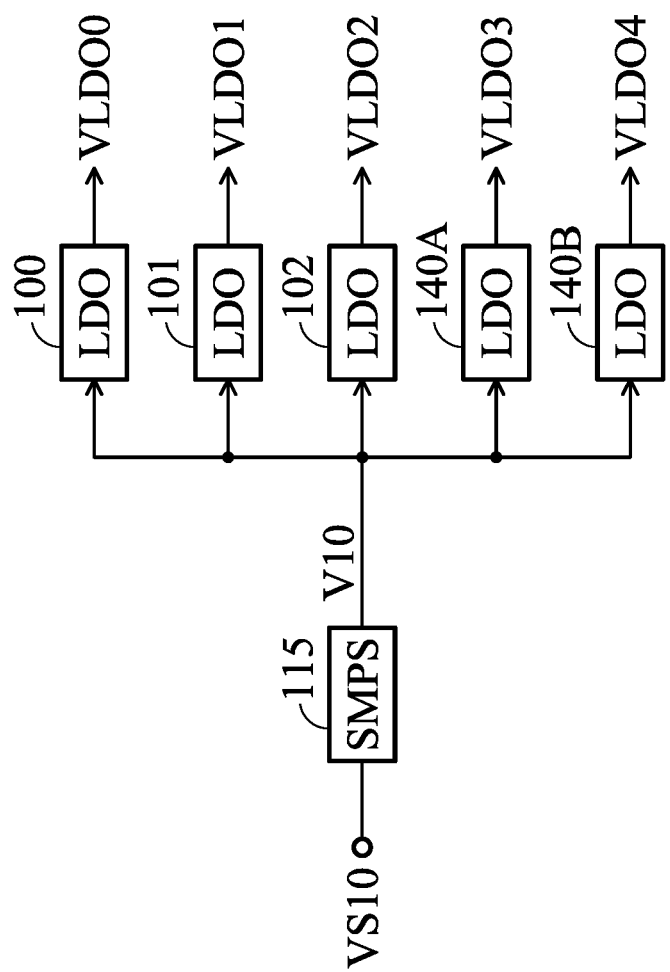
FIG. 3 is a schematic diagram showing an exemplary embodiment of a connection between a switched mode power supply and LDOs in the electronic system of FIG. 1.

FIG. 3 is a schematic diagram showing an exemplary embodiment of a connection between the switched mode power supply 115, the LDOs 116A-116C in the power management circuit 11, and the LDOs 140A-140B in the external power control circuit 14. The power supply voltage V10 generated by the witched mode power converter 115 is provided to the LDOs 116A-116C and 140A-140B. Each of the LDOs 116A-116C and 140A-140B output a corresponding output voltage according to the power supply voltage V10. Referring to FIGS. 1 and 3, the output voltages V116A-V116C and V140A-V140B output by the LDOs 116A-116C and 140A-140B are applied to the user modules 100-102 and 12-13 for driving the user modules 100-102 and 12-13, respectively.

In the following paragraphs, the operation of the electronic system 1 in the sleep mode and the voltage adjustment mode of the switched mode power supply 115 will be described according to FIGS. 1 and 2.

During the operation of the electronic system 1, the power management circuit 11 first sets the priority to the sleep mode or the voltage adjustment mode of the switched mode power supply 115. In the case where the power management circuit 11 sets the priority to the sleep mode, once the switched mode power supply 115 enters the sleep mode, the sleep-mode control signal S25 is asserted to have a high voltage level. According to the asserted sleep-mode priority signal S26 and the asserted sleep-mode control signal S25, the AND gate 114F generates the selection signal S28 with a high voltage level. The multiplexer 114A outputs the sleep-voltage setting signal S24 as the final voltage setting signal S114A according to the selection signal S28 with the high voltage level. The switched mode power supply 115 generates the power supply voltage V10 with the sleep voltage value corresponding to the sleep-voltage setting signal S24. In the embodiment, the sleep voltage value is less than the voltage value corresponding to the voltage setting signal S23. For example, the power supply voltage V10 with the sleep voltage value is the lowest voltage at which the electronic system 1 can operate normally.

When the switched mode power supply 115 does not enter the sleep mode, the sleep-mode control signal S25 is de-asserted to have a low voltage level. According to the asserted sleep-mode priority signal S26 and the de-asserted sleep-mode control signal S25, the AND gate 114F generates the selection signal S28 with a low voltage level. The multiplexer 114A outputs the selected voltage setting signal S114B as the final voltage setting signal S114A according to the selection signal S28 with the low voltage level. The switched mode power supply 115 generates the power supply voltage V10 with the voltage value corresponding to the selected voltage setting signal S114B. How to determine the elected voltage setting signal S114B is described in the following paragraphs related to the voltage adjustment mode.

In the case where the power management circuit 11 sets the priority to the voltage adjustment mode, the sleep-mode priority signal S26 is de-asserted, while the adjustment-mode priority signal S27 is asserted. According to the de-asserted sleep-mode priority signal S26, the AND gate 114F generates the selection signal S28 with a low voltage level. The multiplexer 114A outputs the selected voltage setting signal S114B as the final voltage setting signal S114A according to the selection signal S28 with the low voltage level.

At this time, the processor 10 first controls the user modules 100-102 and 12-13 to operate in the first operation scenario of the electronic system 1. As described above, when one of the user modules 100-102 and 12-13 enables the high-voltage requirement in the first operation scenario, at least one of the determination signals S110(1)-S112(1) is asserted. Once one of the determination signals S110(1)-S112(1) is asserted, the determination signal S113D is de-asserted, and the multiplexer 114B outputs the voltage setting signal S20 as the selected voltage setting signal S114B. Thus, through the selection of the multiplexers 114A and 114B, the voltage setting signal S20 is selected as the final voltage setting signal S20 so that the switched mode power supply 115 generates the power supply voltage V10 with the voltage value corresponding to the voltage setting signal S20. When none of the determination signals S110(1)-S112(1) is asserted, the determination signal S113D is asserted, and the multiplexer 114B outputs the selected voltage setting signal S114C as the selected voltage setting signal S114B.

After the selected voltage setting signal S114B is determined, the processor 10 then controls the user modules 100-102 and 12-13 to operate in the second operation scenario of the electronic system 1. As described above, when one of the user modules 100-102 and 12-13 enables the high-voltage requirement in the second operation scenario, at least one of the determination signals S110(2)-S112(2) is asserted. Once one of the determination signals S110(2)-S112(2) is asserted, the determination signal S113E is de-asserted, and the multiplexer 114C outputs the voltage setting signal S21 as the selected voltage setting signal S114C. Thus, through the selection of the multiplexers 114A-114C, the voltage setting signal S21 is selected as the final voltage setting signal S20 so that the switched mode power supply 115 generates the power supply voltage V10 with the voltage value corresponding to the voltage setting signal S21. When none of the determination signals S110(2)-S112(2) is asserted, the determination signal S113E is asserted, and the multiplexer 114C outputs the selected voltage setting signal S114D as the selected voltage setting signal S114C.

After the selected voltage setting signal S114C is determined, the processor 10 then controls the user modules 100-102 and 12-13 to operate in the third operation scenario of the electronic system 1. As described above, when one of the user modules 100-102 and 12-13 enables the high-voltage requirement in the third operation scenario, at least one of the determination signals S110(3)-S112(3) is asserted. Once one of the determination signals S110(3)-S112(3) is asserted, the determination signal S113F is de-asserted, and the multiplexer 114D outputs the voltage setting signal S22 as the selected voltage setting signal S114D. Thus, through the selection of the multiplexers 114A-114D, the voltage setting signal S22 is selected as the final voltage setting signal S20 so that the switched mode power supply 115 generates the power supply voltage V10 with the voltage value corresponding to the voltage setting signal S22. When none of the determination signals S110(3)-S112(3) is asserted, the determination signal S113F is asserted, and the multiplexer 114D outputs the selected voltage setting signal S114E as the selected voltage setting signal S114D.

After the selected voltage setting signal S114D is determined, once the switched mode power supply 115 enters the sleep mode, the sleep-mode control signal S25 is asserted to have the high voltage level. According to the asserted the adjustment-mode priority signal S27 and the asserted sleep-mode control signal S25, the AND gate 114G generates the selection signal S29 with a high voltage level. The multiplexer 114E outputs the sleep-voltage setting signal S24 as the selected voltage setting signal S114E according to the selection signal S28 with the high voltage level. The switched mode power supply 115 generates the power supply voltage V10 with the sleep voltage value according to the final voltage setting signal S114A. Thus, through the selection of the multiplexers 114A-114E, the sleep-voltage setting signal S24 is selected as the final voltage setting signal S20 so that the switched mode power supply 115 generates the power supply voltage V10 with the sleep voltage value.

After the selected voltage setting signal S114D is determined, when the switched mode power supply 115 does not enter the sleep mode, the sleep-mode control signal S29 is de-asserted to have a low voltage level. According to the de-asserted sleep-mode priority signal S26 and the asserted adjustment-mode priority signal S27, the AND gate 114G generates the selection signal S29 with a low voltage level. The multiplexer 114E outputs the voltage setting signal S23 as the selected voltage setting signal S114E according to the selection signal S29 with the low voltage level. Thus, through the selection of the multiplexers 114A-114E, the voltage setting signal S23 is selected as the final voltage setting signal S20 so that the switched mode power supply 115 generates the power supply voltage V10 with the sleep voltage value corresponding to the voltage setting signal S23.

According to the above embodiments, the power management circuit 11 can record or detect the voltage requirement of each of the user modules 100-102 and 12-13. The power supply voltage V10 generated by the switched mode power supply 115 can be adjusted or changed according to the voltage requirements of the user modules 100-102 and 12-13. Once one user module enables a high-voltage requirement, the switched mode power supply 115 generates the power supply voltage V10 with a greater voltage value. Moreover, when no user module enables the high-voltage requirement, the switched mode power supply 115 generates the power supply voltage V10 with a less voltage value. Through the real-time voltage control for the switched mode power supply 115, the power loss in power transmission from the switched mode power supply 115 to the LDOs 116A-116C and 140A-140B.

Figure 4A:
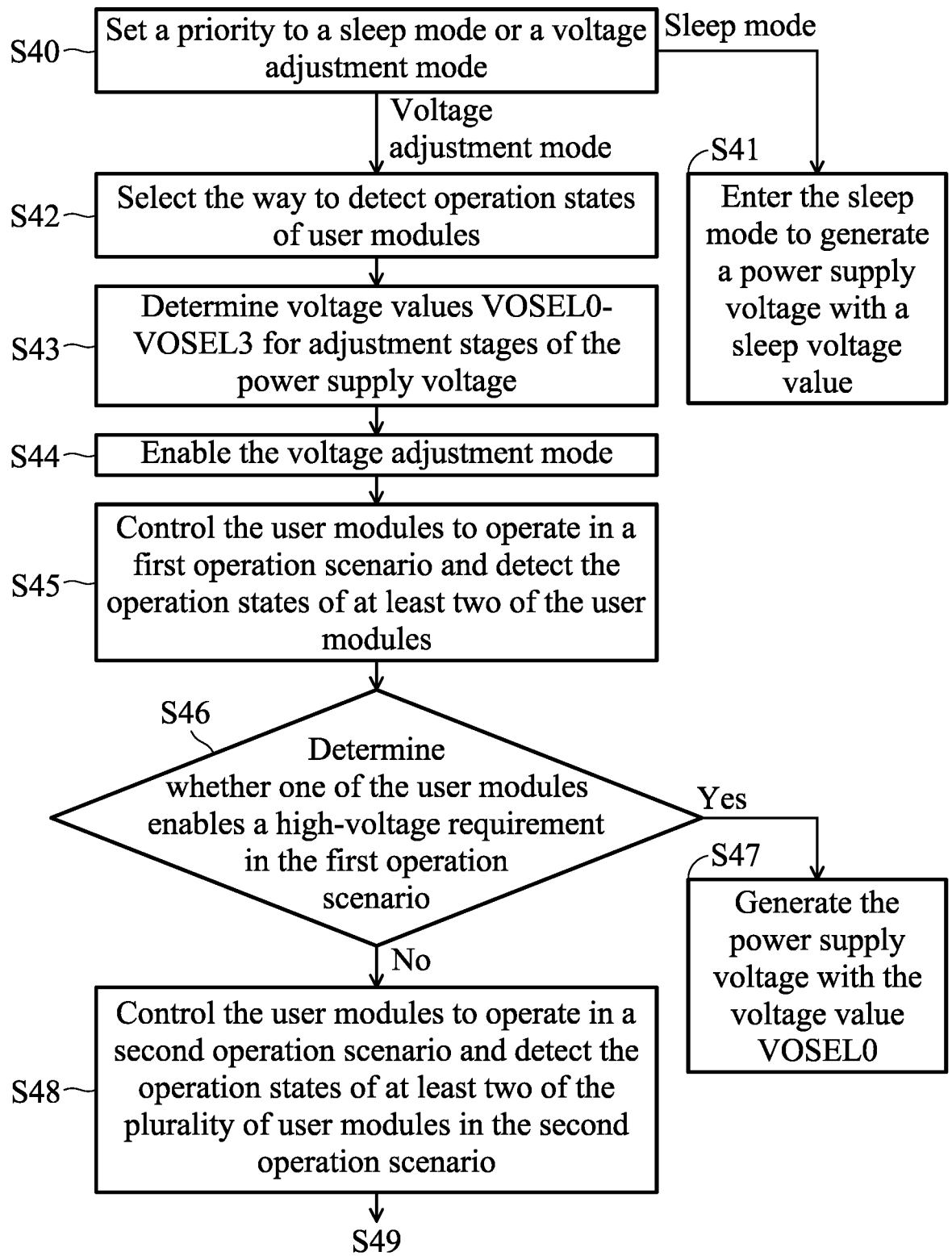
FIGS. 4A and 4B show a flow chart of exemplary embodiment of a voltage method for a switched mode power supply.
Figure 4B:
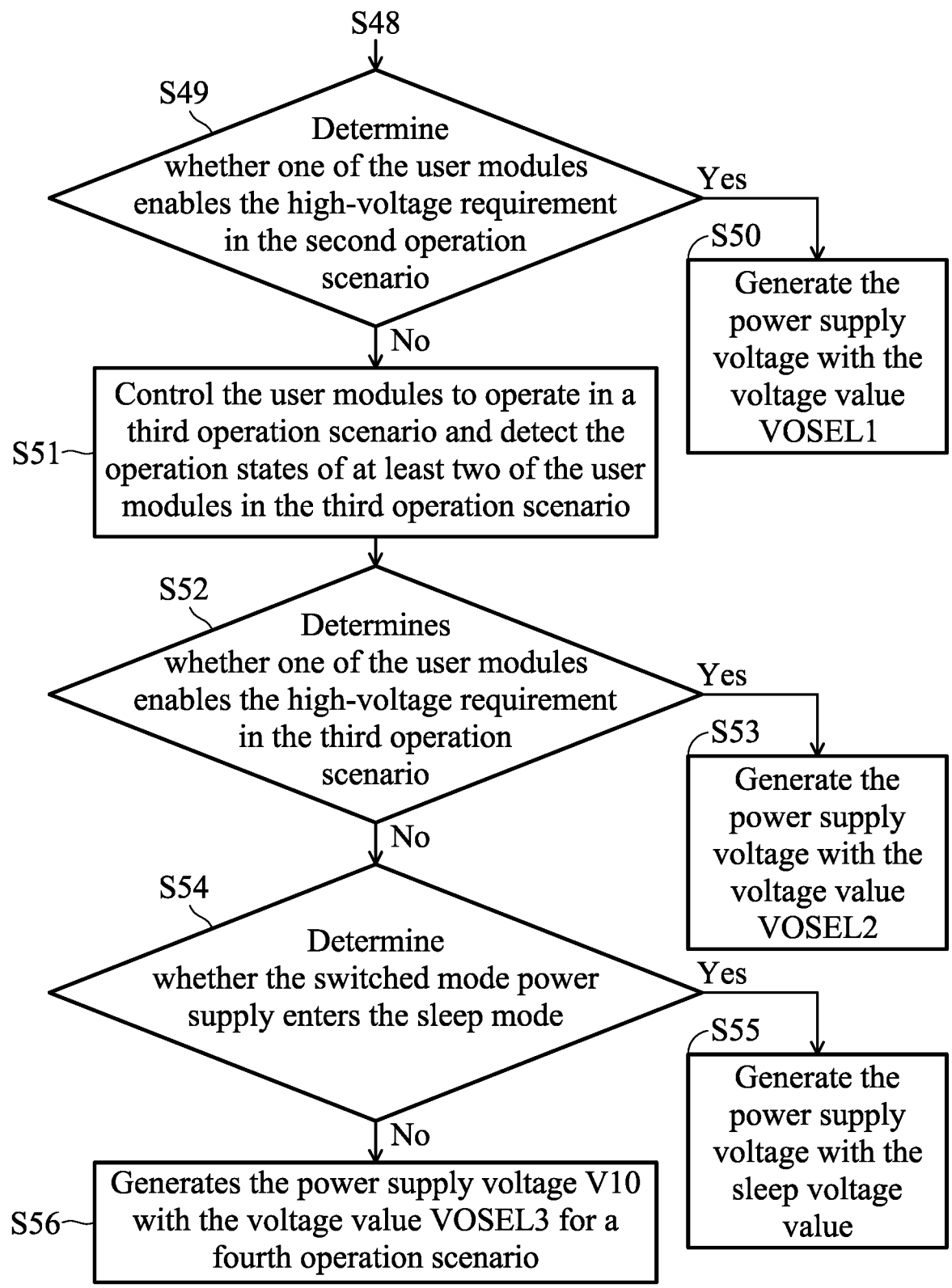

FIGS. 4A-4B shows a flow chart of exemplary embodiment of a voltage method for a switched mode power supply. Referring to FIGS. 1 and 4A-4B, first, the power management circuit 11 sets a priority to a sleep mode or a voltage adjustment mode of the switched mode power supply 115 (Step S40). In the case where the power management circuit 11 sets the priority to the sleep mode, once the switched mode power supply 115 enters the sleep mode, the switched mode power supply 115 generates a power supply voltage V10 with a sleep voltage value (Step S41). In the embodiment, the power supply voltage V10 with the sleep voltage value is the lowest voltage at which the electronic system 1 can operate normally.

When the power management circuit 11 sets the priority to the voltage adjustment mode, the power management circuit 11 selects the way to detect the operation states of the user modules 100-102 and 12-13 through enabling at least one of the voting module 110, the mode register module 111, and the mode detection module 112 (Step S42), and the power management circuit 11 further determines voltage values for the adjustment stages of the power supply voltage V1 (Step S43). In the embodiment, the power management circuit 11 determines four voltage values VOSEL0-VOSEL3 for four operation scenarios. In the embodiment, the voltage values VOSEL0-VOSEL3 are decreased gradually. Then, the power management circuit 11 enables the voltage adjustment mode (Step S44). In other embodiments, at least one of Step S42 and Step S43 is performed after Step S44.

When the voltage adjustment mode is enabled, the processor 10 controls the user modules 100-102 and 12-13 to operate in a first operation scenario of the electronic system 1, and the power management circuit 11 detects the operation states of at least two of the plurality of user modules 100-102 and 12-13 (Step S45). The power management circuit 11 determines whether one of the user modules 100-102 and 12-13 enables a high-voltage requirement according to the detected operation states in the first operation scenario (Step S46). When one of the user modules 100-102 and 12-13 enables the high-voltage requirement (Step S46—Yes), the power management circuit 11 controls the switched mode power supply 115 to generate the power supply voltage V10 with the voltage value VOSEL0 (Step S47). When none of the user modules 100-102 and 12-13 enables the high-voltage requirement (Step S46—No), the processor 10 controls the user modules 100-102 and 12-13 to operate in a second operation scenario of the electronic system 1, and the power management circuit 11 detects the operation states of at least two of the plurality of user modules 100-102 and 12-13 in the second operation scenario (Step S48).

Then, the power management circuit 11 determines whether one of the user modules 100-102 and 12-13 enables the high-voltage requirement according to the detected operation states in the second operation scenario (Step S49). When one of the user modules 100-102 and 12-13 enables the high-voltage requirement (Step S49—Yes), the power management circuit 11 controls the switched mode power supply 115 to generate the power supply voltage V10 with the voltage value VOSEL1 (Step S50). When none of the user modules 100-102 and 12-13 enables the high-voltage requirement (Step S49—No), the processor 10 controls the user modules 100-102 and 12-13 to operate in a third operation scenario of the electronic system 1, and the power management circuit 11 detects the operation states of at least two of the plurality of user modules 100-102 and 12-13 in the third operation scenario (Step S51).

After Step S51, the power management circuit 11 determines whether one of the user modules 100-102 and 12-13 enables the high-voltage requirement according to the detected operation states in the third operation scenario (Step S52). When one of the user modules 100-102 and 12-13 enables the high-voltage requirement (Step S52—Yes), the power management circuit 11 controls the switched mode power supply 115 to generate the power supply voltage V10 with the voltage value VOSEL2 (Step S53). When none of the user modules 100-102 and 12-13 enables the high-voltage requirement (Step S52—No), the power management circuit 11 10 determines whether the switched mode power supply 115 enters the sleep mode (Step S54). When the switched mode power supply 115 enters the sleep mode (Step S54—Yes), the switched mode power supply 115 generates the power supply voltage V10 with the sleep voltage value (Step S55). When the switched mode power supply 115 does not enter the sleep mode (Step S54—No), the switched mode power supply 115 generates the power supply voltage V10 with the voltage value VOSEL3 for a fourth operation scenario (Step S55).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage control method for a switched mode power supply, the switched mode power supply generating a power supply voltage to a plurality of low dropout voltage regulators, the plurality of low dropout voltage regulators driving a plurality of user modules respectively in an electronic system according to the power supply voltage, and the voltage control method comprising:
- determining a plurality of voltage values at least comprising a first voltage value;
- enabling a voltage adjustment mode of the switched mode power supply; and
- in the voltage adjustment mode:
  - controlling the plurality of user modules to operate in a first operation scenario of the electronic system;
  - determining whether one of the plurality of user modules enables a high-voltage requirement according to operation states of at least two of the plurality of user modules in the first operation scenario to generate a first determination signal;
  - in response to the first determination signal indicating that one of the plurality of user modules enables the high-voltage requirement, controlling the switched mode power supply to generate the power supply voltage with the first voltage value, wherein the plurality of low dropout voltage regulators output a plurality of output voltages according to the power supply voltage for driving the plurality of user modules respectively; and
  - in response to the first determination signal indicating that none of the plurality of user modules enables the high-voltage requirement, controlling the switched mode power supply to generate the power supply voltage with a voltage value of the plurality of voltage values that is less than the first voltage value.

2. The voltage control method as claimed in claim 1, wherein in the voltage adjustment mode, in response to the first determination indicating that none of the plurality of user modules enables the high-voltage requirement, controlling the switched mode power supply to generate the power supply voltage with the voltage value of the plurality of voltage values that is less than the first voltage value comprises:
- controlling the plurality of user modules to operate in a second operation scenario of the electronic system;
- determining whether one of the plurality of user modules enables the high-voltage requirement according to the operation states of at least two of the plurality of user modules in the second operation scenario to generate a second determination signal;
- in response to the second determination signal indicating that one of the plurality of user modules enables the high-voltage requirement, controlling the switched mode power supply to generate the power supply voltage with a second voltage value of the plurality of voltage values; and
- in response to the second determination signal indicating that none of the plurality of user modules enables the high-voltage requirement, controlling the switched mode power supply to generate the power supply voltage with a third voltage value of the plurality of voltage values,
- wherein the second voltage value is less than the first voltage value, and the third voltage value is less than the second voltage value.

3. The voltage control method as claimed in claim 2, wherein in the voltage adjustment mode, in response to the first determination indicating that none of the plurality of user modules enables the high-voltage requirement, controlling the switched mode power supply to generate the power supply voltage with the voltage value of the plurality of voltage values that is less than the first voltage value further comprises:
- in response to the third voltage value being the smallest one of the plurality of voltage values, determining whether a sleep mode of the switched mode power supply is enabled; and
- in response to the sleep mode being enabled, controlling the switched mode power supply to generate the power supply voltage with a sleep voltage value,
- wherein the sleep voltage value is less than the third voltage value.

4. The voltage control method as claimed in claim 1, further comprising:
- setting a priority to a sleep mode of the switched mode power supply; and
- in response to the sleep mode being enabled, controlling the switched mode power supply to generate the power supply voltage with a sleep voltage value,
- wherein the sleep voltage value is less than the plurality of voltage values.

5. The voltage control method as claimed in claim 1, wherein in the voltage adjustment mode, in response to the first determination indicating that none of the plurality of user modules enables the high-voltage requirement, controlling the switched mode power supply to generate the power supply voltage with the voltage value of the plurality of voltage values that is less than the first voltage value comprises:
- in response to the voltage value less than the first voltage value being the smallest one of the plurality of voltage values, determining whether a sleep mode of the switched mode power supply is enabled; and
- in response to the sleep mode being enabled, controlling the switched mode power supply to generate the power supply voltage with the sleep voltage value,
- wherein the sleep voltage value is less than the plurality of voltage values.

6. The voltage control method as claimed in claim 1, wherein, in the voltage adjustment mode:
- determining whether one of the plurality of user modules enables the high-voltage requirement according to the operation states of at least two of the plurality of user modules in the first operation scenario to generate the first determination signal comprises:
  - reading at least two voting bits from a register of the electronic system, wherein the at least two voting bits correspond to the operation states of at least two of the plurality of the user modules respectively, and one valid voting bit represents that the corresponding user module enables the high-voltage requirement; and
  - determining whether one of the at least two voting bits is valid to generate the first determination signal; and
- in response to the first determination signal indicating that one of the plurality of user modules enables the high-voltage requirement, controlling the switched mode power supply to generate the power supply voltage with the first voltage value comprises:
  - in response to the first determination signal indicating that one of the at least two voting bits is valid, controlling the switched mode power supply to generate the power supply voltage with the first voltage value.

7. The voltage control method as claimed in claim 1, wherein, in the voltage adjustment mode:
- determining whether one of the plurality of user modules enables the high-voltage requirement according to the operation states of at least two of the plurality of user modules in the first operation scenario to generate the
first determination signal comprises:
  detecting voltage levels of a plurality of pins of a
    processor, wherein the processor determines the
    voltage levels of the plurality of pins according to the
    operation states of the plurality of user modules, the
    operation state of each of the plurality of user
    modules is determined by a normal mode or a low
    power mode of the corresponding user module, and
    one pin with a high voltage level indicates that the
    corresponding user module enables the high-voltage
    requirement for the normal mode; and
  determining whether one of the voltage levels of the
    plurality of pins is high to generate the first determination signal; and
in response to the first determination signal indicating that
  one of the plurality of user modules enables the high-voltage requirement, controlling the switched mode
  power supply to generate the power supply voltage
  with the first voltage value comprises:
  in response to the first determination signal indicating
    that one of the voltage levels of the plurality of pins
    is high, controlling the switched mode power supply
    to generate the power supply voltage with the first
    voltage value.

8. The voltage control method as claimed in claim 1,
wherein, in the voltage adjustment mode:
  determining whether one of the plurality of user modules
    enables the high-voltage requirement according to the
    operation states of at least two of the plurality of user
    modules in the first operation scenario to generate the
    first determination signal comprises:
    reading a plurality of mode bits from a register of the
      electronic system, wherein the plurality of mode bits
      correspond to the operation states of the plurality of
      the user modules respectively, the operation state of
      each of the plurality of user modules is determined
      according to a normal mode or a low power mode of
      the corresponding user module, and one valid mode
      bit represents that the corresponding user module
      enables the high-voltage requirement for the normal
      mode; and
    determining whether one of the plurality of mode bits
      is valid to generate the first determination signal; and
  in response to the first determination signal indicating that
    one of the plurality of user modules enables the high-voltage requirement, controlling the switched mode
    power supply to generate the power supply voltage
    with the first voltage value comprises:
    in response to the first determination signal indicating
      that one of the plurality of mode bits is valid,
      controlling the switched mode power supply to generate the power supply voltage with the first voltage
      value.

9. An electronic system comprising:
a power management circuit comprising:
  a switched mode power supply generating a power
    supply voltage,
  wherein the power management circuit determines a
    plurality of voltage values at least comprising a first
    voltage value and enables a voltage adjustment mode
    of the switched mode power supply;
a plurality of low dropout voltage regulators outputting a
  plurality of output voltages according to the power
  supply voltage for driving the plurality of user modules
  respectively;
a plurality of user modules driven by the plurality of
  output voltages respectively; and
a processor controlling the plurality of user modules to
  operate in a first operation scenario of the electronic
  system in response to the voltage adjustment mode,
wherein in the voltage adjustment mode, the power management circuit operates to:
  determine whether one of the plurality of user modules
    enables a high-voltage requirement according to
    operation states of at least two of the plurality of user
    modules in the first operation scenario to generate a
    first determination signal,
  in response to the first determination signal indicating
    that one of the plurality of user modules enables the
    high-voltage requirement, control the switched mode
    power supply to generate the power supply voltage
    with the first voltage value, wherein the plurality of
    low dropout voltage regulators output a plurality of
    output voltages according to the power supply voltage for driving the plurality of user modules respectively, and
  in response to the first determination signal indicating
    that none of the plurality of user modules enables the
    high-voltage requirement, control the switched mode
    power supply to generate the power supply voltage
    with a voltage value of the plurality of voltage values
    that is less than the first voltage value.

10. The electronic system as claimed in claim 9, wherein:
the power management circuit generates a first voltage
  setting signal according to the first voltage value and
  further generates a specific voltage setting signal
  according to the voltage value of the plurality of
  voltage values that is less than the first voltage value,
  and
the power management circuit comprises:
  a first multiplexer receiving the first voltage setting
    signal, the specific voltage setting signal, and the first
    determination signal and outputting a first selected
    voltage setting signal to control the switched mode
    power supply,
  wherein the multiplexer is controlled by the first determination signal to selectively output one of the first
    voltage setting signal and the specific voltage setting
    signal as the first selected voltage setting signal,
  wherein in response to the first determination signal
    indicating that one of the plurality of user modules
    enables the high-voltage requirement, the multiplexer outputs the first voltage setting signal as the
    first selected voltage setting signal,
  wherein in response to the first determination signal
    indicating that none of the plurality of user modules
    enables the high-voltage requirement, the multiplexer outputs the specific voltage setting signal as
    the first selected voltage setting signal, and
  wherein the switched mode power supply receives the
    first selected voltage setting signal and generates the
    power supply voltage according to the first selected
    voltage setting signal.

11. The electronic system as claimed in claim 9, wherein:
in the voltage adjustment mode, in response to the first
  determination signal indicating that none of the plurality of user modules enables the high-voltage requirement, the processor controls the plurality of user modules to operate in a second operation scenario of the
  electronic system, and
in the voltage adjustment mode, the power management
  circuit operates to:

determine whether one of the plurality of user modules enables the high-voltage requirement according to the operation states of at least two of the plurality of user modules in the second operation scenario to generate a second determination signal;

in response to the second determination signal indicating that one of the plurality of user modules enables the high-voltage requirement, control the switched mode power supply to generate the power supply voltage with a second voltage value of the plurality of voltage values, and in response to the second determination signal indicating that none of the plurality of user modules enables the high-voltage requirement, control the switched mode power supply to generate the power supply voltage with a third voltage value of the plurality of voltage values, wherein the second voltage value is less than the first voltage value, and the third voltage value is less than the second voltage value.

12. The electronic system as claimed in claim 11, wherein in the voltage adjustment, the power management circuit operates to:

in response to the third voltage value being the smallest one of the plurality of voltage values, determine whether a sleep mode of the switched mode power supply is enabled, and in response to the sleep mode being enabled, control the switched mode power supply to generate the power supply voltage with a sleep voltage value, wherein the sleep voltage value is less than the third voltage value.

13. The electronic system as claimed in claim 9, wherein the power management circuit operates to:

set a priority to a sleep mode of the switched mode power supply, and in response to the sleep mode being enabled, control the switched mode power supply to generate the power supply voltage with a sleep voltage value, wherein the sleep voltage value is less than the plurality of voltage values.

14. The electronic system as claimed in claim 9, wherein in the voltage adjustment mode, the power management circuit operates to:

in response to the voltage value less than the first voltage value being the smallest one of the plurality of voltage values, determine whether a sleep mode of the switched mode power supply is enabled, and in response to the sleep mode being enabled, control the switched mode power supply to generate the power supply voltage with the a sleep voltage value, wherein the sleep voltage value is less than the plurality of voltage values.

15. The electronic system as claimed in claim 9, wherein:

the power management circuit comprises a register storing at least two voting bits, wherein the at least two voting bits correspond to the operation states of at least two of the plurality of the user modules respectively, and one valid voting bit represents that the corresponding user module enables the high-voltage requirement, and in the voltage adjustment mode, the power management circuit operates to:

read the at least two voting bits from the register, and determine whether one of the at least two voting bits is valid to generate the first determination signal, in response to the first determination signal indicating that one of the at least two voting bits is valid, control the switched mode power supply to generate the power supply voltage with the first voltage value.

16. The electronic system as claimed in claim 9, wherein:

the power management circuit is coupled to a plurality of pins of the processor, and the processor determines voltage levels of the plurality of pins according to the operation states of the plurality of user modules, the operation state of each of the plurality of user modules is determined according to a normal mode or a low power mode of the corresponding user module, and the processor sets one pin to a high voltage level in response to the corresponding user module enabling the high-voltage requirement for the normal mode, in the voltage adjustment mode, the power management circuit operates to:

detect voltage levels of a plurality of pins of a processor, and determine whether one of the voltage levels of the plurality of pins is high to generate the first determination signal, and in response to the first determination signal indicating that one of the voltage levels of the plurality of pins is high, control the switched mode power supply to generate the power supply voltage with the first voltage value.

17. The electronic system as claimed in claim 9, wherein:

the power management circuit comprises a register storing a plurality of mode bits, and the plurality of mode bits correspond to the operation states of the plurality of the user modules respectively, the operation mode of each of the plurality of user modules determined according to a normal mode or a low power mode of the corresponding user module, and one valid mode bit represents that the corresponding user module enables the high-voltage requirement for the normal mode, in the voltage adjustment mode, the power management circuit operates to:

read the plurality of mode bits from the register, and determine whether one of the plurality of mode bits is valid to generate the first determination signal, and in response to the first determination signal indicating that one of the plurality of mode bits is valid, control the switched mode power supply to generate the power supply voltage with the first voltage value.

18. The electronic system as claimed in claim 9, wherein at least one of the plurality of low dropout voltage regulators is disposed outside the power management circuit, and the other low dropout voltage regulators of the plurality of low dropout voltage regulators are disposed in the power management circuit.

19. The electronic system as claimed in claim 9, wherein at least one of the plurality of user modules is disposed outside the processor, and the other user modules of the plurality of user modules are disposed in the processor.

20. The electronic system as claimed in claim 9, wherein the switched mode power supply is a buck, boost and buck-boost related converter.

* * * * *